Feb. 3, 1970  R. H. TAYLOR  3,492,761
GROWTH CHAMBERS
Filed Dec. 26, 1967
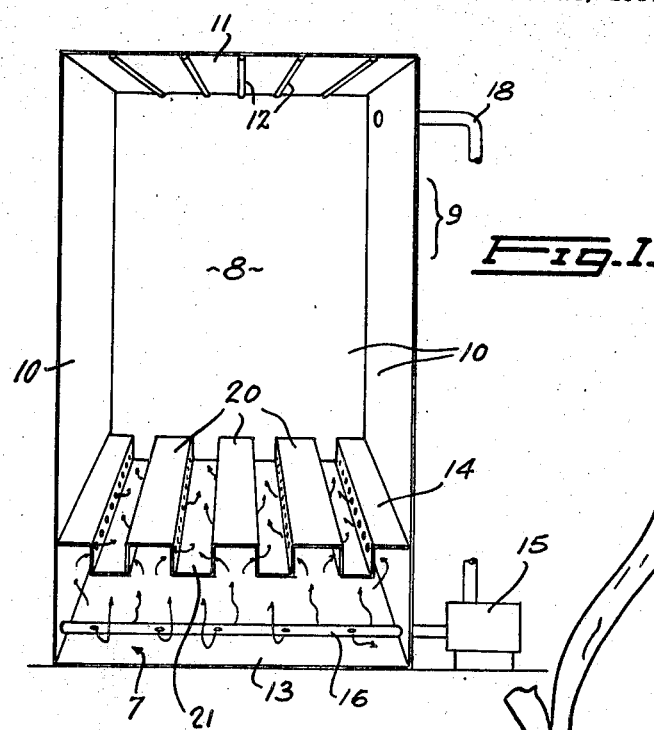
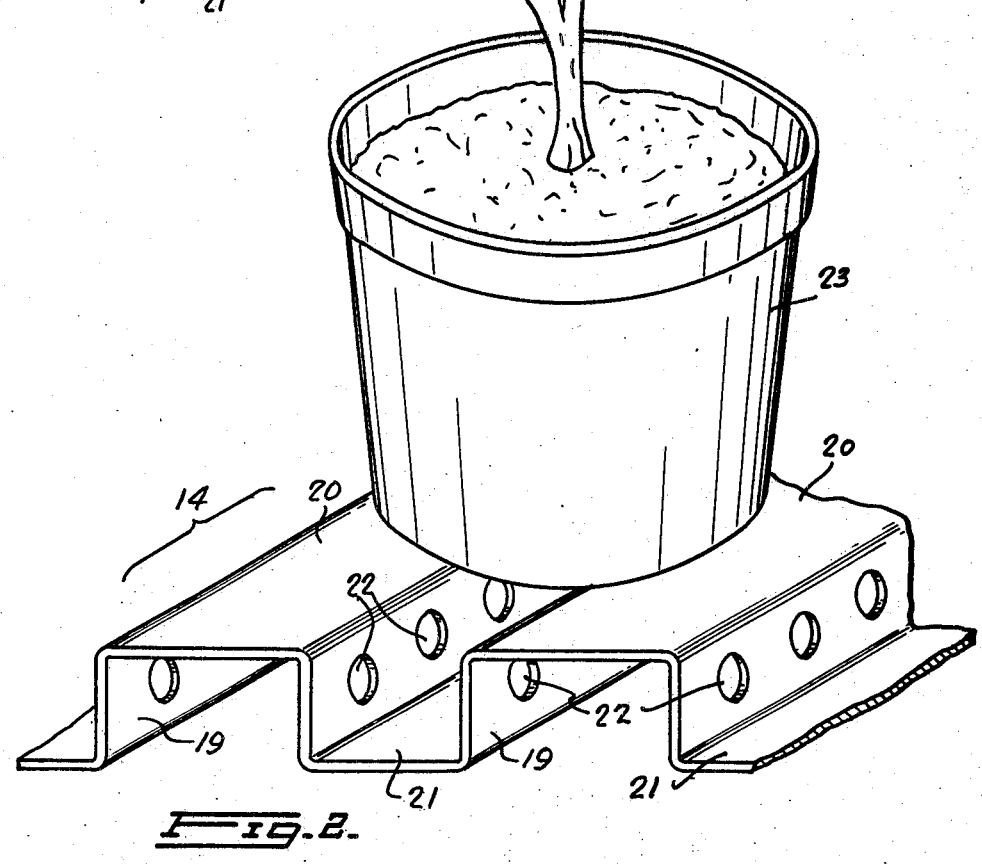

United States Patent Office  3,492,761
Patented Feb. 3, 1970

3,492,761
GROWTH CHAMBERS
Richard H. Taylor, Winnipeg, Manitoba, Canada, assignor to Controlled Environments Limited, Winnipeg, Manitoba, Canada
Filed Dec. 26, 1967, Ser. No. 693,468
Int. Cl. A01g 9/24; F24f 13/08
U.S. Cl. 47—17                                     1 Claim

ABSTRACT OF THE DISCLOSURE

A growth chamber for plants in which the perforated floor supporting the plants is designed for an air flow that minimises disturbance of the plants, the floor being formed with holes extending horizontally into channels so that the plant pots cannot occlude the holes and so that the air passes horizontally through the holes to dissipate its kinetic energy in the channels before moving slowly upward around the pots.

---

This invention relates to improvements in so-called growth rooms or chambers. The main function of a growth chamber is to serve as an enclosed space for the growing of plants under carefully controlled conditions, for example with the temperature and humidity of the air closely regulated and usually with the application of light to the plants, carried out in accordance with a predetermined programme. Such growth chambers are commonly used in the carrying out of experimental work on plant growth and may also be used to sustain animal life under controlled conditions rather than plant life.

In order to maintain the correct temperature and humidity of the air in a growth chamber it is necessary to provide a steady flow of conditioned air into the chamber having the desired characteristics. Difficulties have been experienced in the past in achieving this necessary flow of air in a manner that is relatively unimpeded by the physical presence of the plants themselves or the pots or flats in which they are carried, while nevertheless maintaining a sufficient flow of air through the chamber without at the same time generating local jets or streams of air with an excessive velocity. It is normally undesirable to disturb the leaves of the plants by the movement of the air, for which reason it is necessary to keep the velocity of the air very low.

The object of the present invention is to provide an improved construction of growth chamber in which a particularly advantageous air flow condition is achieved in relation to the desirable criteria discussed above.

To this end, the invention consists of the provision in an enclosed growth chamber of (a) a perforated floor for supporting plants thereon and serving to divide the growth chamber into an upper and a lower space,
(b) and means for supplying conditioned air to said lower space to flow through the perforated floor into the upper space in which said plants are located,
(c) wherein said floor is formed of sheet material shaped to include a series of parallel, spaced-apart ridges defining channels therebetween, said ridges having upper surfaces disposed sufficiently close together to support plant pots thereon with such pots straddling the channels,
(d) said channels having generally vertically extending sidewalls with holes extending therethrough for air to flow from said lower space generally horizontally into said channels to dissipate kinetic energy therein and subsequently to flow at low velocity vertically upwardly from said channels into said upper space around the sides of said pots.

One method of carrying the invention into practice is illustrated diagrammatically and by way of example only in the accompanying drawings.

In the drawings:

FIGURE 1 shows a cut-away view of a typical growth chamber having a floor modified in accordance with the present invention; and FIGURE 2 shows a large scale fragment of the floor of FIGURE 1, with a plant pot located thereon.

The growth chamber 9 shown in FIGURE 1 comprises walls 10; a ceiling 11 with lights 12 thereon; a bottom 13 and a perforated floor 14 on which the plants will be arranged and which serves to divide the chamber 9 into an upper space 8 and a lower space 7. Conditioned air under predetermined conditions of temperature and humidity is generated in an air supply mechanism 15 which includes means for pumping the air along a perforated tube 16 from which it escapes into the space 7 beneath the floor 14. An outlet pipe 18 is provided near the top of the upper space 8 and air escaping therefrom can simply pass to atmosphere or may be recycled through the mechanism 15.

With the exception of the nature of the floor 14, the construction of the growth chamber herein described is conventional.

Various forms of floor have been proposed in the past for growth chambers, but none has been found as satisfactory as the structure of the floor 14 shown in FIGURES 1 and 2. Former floors have suffered from either or both of two disadvantages: namely; that the placing of pots, flats or other containers for plants on the floor has tended directly to occlude the holes or other spaces provided for air to escape from the lower space into the main upper space of the growth chamber; and that the holes in the floor have tended to give rise to the formation of air jets or streams of a velocity sufficient to disturb delicate plants.

These difficulties are avoided by the use of a floor of the type shown in FIGURES 1 and 2, consisting of sheet material formed to include a series of parallel, spaced-apart ridges 20 defining channels 21 therebetween, the ridges 20 having upper surfaces disposed sufficiently close together to support plant pots 23 or the like. The channels 21 between each pair of ridges 20 are formed with generally vertically extending sidewalls 19 having holes 22 through which the air flows from the space 7 to the space 8. By virtue of the fact that these holes 22 face across the channels 21, the jets of air that project from them initially travel horizontally across the channels to dissipate most of their kinetic energy within the channels. This air subsequently rises at a low velocity from the channels to flow between pots, such as the pot 23 shown in FIGURE 2. In this context a "low" velocity is one that is sufficiently slow not to disturb delicate plants or to cause movement of the leaves of any plants.

If it is found desirable in any given installation, the holes 22 may be staggered, so as not to project air streams directly at one another across the channels 21. In this way each air jet will have the full width of a channel 21 in which to dissipate its kinetic energy.

Conveniently the floor 14 can be constructed from sheet metal, and the shape that has been chosen for the floor to achieve improvement in the air flow conditions, as explained above, has the further advantage that it is structurally strong and can be conveniently installed and/or removed for cleaning as a single unit (in contrast to separate slats that have been used in the past). For simplicity of illustration no supports have been shown under the floor in FIGURE 1, but one or more of such supports may of course be provided, if required, having regard to the length of the span between the walls, the rigidity of the material employed and the weight of the plants housed in the chamber.

I claim:
1. In an enclosed growth chamber
   (a) a perforated floor for supporting plants thereon and serving to divide the growth chamber into an upper and a lower space,
   (b) and means for supplying conditioned air to said lower space to flow through the perforated floor into the upper space in which said plants are located,
   (c) wherein said floor is formed of sheet material shaped to include a series of parallel, spaced-apart ridges defining channels therebetween and extending substantially uniformly across the entire floor, said ridges having upper surfaces disposed sufficiently close together to support plant pots thereon with such pots straddling the channels,
   (d) said channels having generally vertically extending sidewalls with holes extending therethrough for air to flow from said lower space generally horizontally into said channels to dissipate kinetic energy therein and subsequently to flow at low velocity vertically upwardly from each of said channels into said upper space around the sides of said pots substantially uniformly across the floor.

References Cited

UNITED STATES PATENTS

| | | | |
|---|---|---|---|
| 780,774 | 1/1905 | Bate | 47—18 |
| 783,182 | 2/1905 | Meyere | 47—19 |
| 1,360,669 | 11/1920 | Nielsen | 47—18 |
| 3,106,801 | 10/1963 | Risacher | 47—17 |

FOREIGN PATENTS 969,317  12/1950  France.

ROBERT E. BAGWILL, Primary Examiner

U.S. Cl. X.R.

98—114